United States Patent
Line et al.

(10) Patent No.: US 10,166,894 B2
(45) Date of Patent: Jan. 1, 2019

(54) SEATBACK COMFORT CARRIER

(71) Applicant: Ford Global Technologies, LLC, Dearborn, MI (US)

(72) Inventors: Johnathan Andrew Line, Northville, MI (US); Marcos Silva Kondrad, Macomb, MI (US); Richard Joseph Soyka, Jr., Shelby Township, MI (US); Daniel Ferretti, Commerce Township, MI (US); S. M. Akbar Berry, Windsor (CA); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/178,258

(22) Filed: Jun. 9, 2016

(65) Prior Publication Data

US 2017/0355290 A1 Dec. 14, 2017

(51) Int. Cl.
*B60N 2/66* (2006.01)
*B60N 2/64* (2006.01)
*B60N 2/68* (2006.01)

(52) U.S. Cl.
CPC ............ *B60N 2/66* (2013.01); *B60N 2/643* (2013.01); *B60N 2/686* (2013.01)

(58) Field of Classification Search
CPC .......... B60N 2/66; B60N 2/667; B60N 2/643; B60N 2/686
See application file for complete search history.

(56) References Cited

U.S. PATENT DOCUMENTS

| 2,725,921 A | 12/1955 | Markin |
| 2,938,570 A | 5/1960 | Flajole |
| 3,330,598 A | 7/1967 | Whiteside |

(Continued)

FOREIGN PATENT DOCUMENTS

| DE | 3115269 A1 | 10/1982 |
| DE | 3119867 A1 | 12/1982 |

(Continued)

OTHER PUBLICATIONS

Mladenov, Opel Insignia Receives Seal of Approval for Ergonomic Seats, Aug. 27, 2008, http://www.automobilesreview.com/auto-news/opel-insignia-receives-seal-of-approval-for-ergonomic-seats/4169/.

(Continued)

*Primary Examiner* — Timothy J Brindley
(74) *Attorney, Agent, or Firm* — Vichit Chea; Price Heneveld LLP

(57) ABSTRACT

A vehicle seating assembly includes a seatback. A back panel includes a front closeout panel. A carrier supports the seatback and includes an upper thoracic region having a peripheral support. A peripheral gap is defined between the front closeout panel and the upper thoracic region. A bottom portion of the upper thoracic region includes a lower wall having a sinusoidal configuration. A lower lumbar region includes a peripheral support. A peripheral gap is defined between the front closeout panel and the lower lumbar region. An upper portion of the lower lumbar region includes an upper wall having a sinusoidal configuration. A plurality of concave connectors couple the lower wall of the upper thoracic region with the upper wall of the lower lumbar region.

18 Claims, 15 Drawing Sheets

(56) References Cited

U.S. PATENT DOCUMENTS

| | | |
|---|---|---|
| 3,612,607 A | 10/1971 | Lohr et al. |
| 3,632,166 A | 1/1972 | Lohr et al. |
| 3,792,897 A | 2/1974 | Alson |
| 3,833,257 A | 9/1974 | Dove |
| 3,880,462 A | 4/1975 | Mednick |
| 3,915,421 A | 10/1975 | Le Forestier |
| 4,017,118 A | 4/1977 | Cawley |
| 4,115,170 A | 9/1978 | Sanson |
| 4,190,286 A | 2/1980 | Bentley |
| 4,225,989 A | 10/1980 | Corbett et al. |
| 4,306,322 A | 12/1981 | Young et al. |
| 4,415,203 A | 11/1983 | Cawley |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,580,837 A | 4/1986 | Bayley |
| 4,583,255 A | 4/1986 | Mogaki et al. |
| 4,589,695 A | 5/1986 | Isono |
| 4,592,588 A | 6/1986 | Isono et al. |
| 4,629,253 A | 12/1986 | Williams |
| 4,634,179 A | 1/1987 | Hashimoto et al. |
| 4,655,505 A | 4/1987 | Kashiwamura et al. |
| 4,711,497 A | 12/1987 | Kazaoka et al. |
| 4,726,086 A | 2/1988 | McEvoy |
| 4,752,982 A | 6/1988 | Jones et al. |
| 4,773,703 A | 9/1988 | Krügener et al. |
| 4,792,186 A | 12/1988 | Benjamin et al. |
| 4,796,313 A | 1/1989 | DiMatteo et al. |
| 4,833,614 A | 5/1989 | Saitoh et al. |
| 4,856,844 A | 8/1989 | Isono |
| 4,858,992 A | 8/1989 | LaSota |
| 4,861,104 A | 8/1989 | Malak |
| 4,893,367 A | 1/1990 | Heimreid et al. |
| 4,938,529 A | 7/1990 | Fourrey |
| 4,965,899 A | 10/1990 | Sekido et al. |
| 4,966,410 A | 10/1990 | Bishai |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,067,772 A | 11/1991 | Koa |
| 5,082,326 A | 1/1992 | Sekido et al. |
| 5,096,259 A | 3/1992 | Baker |
| 5,120,109 A | 6/1992 | Rangoni |
| 5,127,708 A | 7/1992 | Kishi et al. |
| 5,129,704 A | 7/1992 | Kishi et al. |
| 5,174,526 A | 12/1992 | Kanigowski |
| 5,190,348 A | 3/1993 | Colasanti |
| 5,243,722 A | 9/1993 | Gusakov |
| 5,320,409 A | 6/1994 | Katoh et al. |
| 5,544,942 A | 4/1996 | Vu Khac et al. |
| 5,518,294 A | 5/1996 | Ligon, Sr. et al. |
| 5,609,394 A | 3/1997 | Ligon, Sr. et al. |
| 5,658,050 A | 8/1997 | Lorbiecki |
| 5,662,384 A | 9/1997 | O'Neill et al. |
| 5,755,493 A | 5/1998 | Kodaverdian |
| 5,758,924 A | 6/1998 | Vishey |
| 5,769,489 A | 6/1998 | Dellanno |
| 5,785,669 A | 7/1998 | Proctor et al. |
| 5,823,620 A | 10/1998 | Le Caz |
| 5,836,648 A | 11/1998 | Karschin et al. |
| 5,860,699 A | 1/1999 | Weeks |
| 5,893,609 A | 4/1999 | Schmidt |
| 5,906,586 A | 5/1999 | Graham |
| 5,913,568 A | 6/1999 | Brightbill et al. |
| 5,918,696 A | 7/1999 | VanVoorhies |
| 5,967,608 A | 10/1999 | Van Sickle |
| 6,030,040 A | 2/2000 | Schmid et al. |
| 6,062,642 A | 5/2000 | Sinnhuber et al. |
| 6,068,339 A | 5/2000 | Linzalone |
| 6,088,642 A | 7/2000 | Finkelstein et al. |
| 6,106,071 A | 8/2000 | Aebischer et al. |
| 6,203,105 B1 | 3/2001 | Rhodes, Jr. |
| 6,220,661 B1 | 4/2001 | Peterson |
| 6,273,810 B1 | 8/2001 | Rhodes, Jr. et al. |
| 6,296,308 B1 | 10/2001 | Cosentino et al. |
| 6,349,993 B1 | 2/2002 | Walsh |
| 6,394,546 B1 | 5/2002 | Knoblock et al. |
| 6,398,299 B1 | 6/2002 | Angereer et al. |
| 6,398,306 B1 | 6/2002 | MacK |
| 6,530,622 B1 | 3/2003 | Ekern et al. |
| 6,554,365 B2 | 4/2003 | Karschin et al. |
| 6,565,153 B2 | 5/2003 | Hensel et al. |
| 6,637,818 B2 | 10/2003 | Williams |
| 6,682,059 B1 | 1/2004 | Daniels et al. |
| 6,695,406 B2 | 2/2004 | Plant |
| 6,758,522 B2 | 7/2004 | Ligon, Sr. et al. |
| 6,820,930 B2 | 11/2004 | Dellanno |
| 6,860,559 B2 | 3/2005 | Schuster, Sr. et al. |
| 6,929,324 B2 | 8/2005 | Enomoto et al. |
| 6,955,399 B2 | 10/2005 | Hong |
| 7,068,178 B2 | 6/2006 | Oh |
| 7,093,898 B2 | 8/2006 | Ladron De Guevara |
| 7,131,694 B1 | 11/2006 | Buffa |
| 7,143,658 B2 | 12/2006 | Schubert |
| 7,152,920 B2 | 12/2006 | Sugiyama et al. |
| 7,311,681 B1 | 12/2007 | Vaccarella |
| 7,322,651 B2 | 1/2008 | Makhsous et al. |
| 7,387,339 B2 | 6/2008 | Bykov et al. |
| 7,441,838 B2 | 10/2008 | Patwardhan |
| 7,445,292 B2 | 11/2008 | Moule |
| 7,488,040 B2 | 2/2009 | Dozsa-Farkas |
| 7,517,024 B2 | 4/2009 | Cvek |
| 7,523,888 B2 | 4/2009 | Ferry et al. |
| 7,547,068 B2 | 6/2009 | Davis |
| 7,562,934 B2 | 7/2009 | Swan et al. |
| 7,604,294 B2 | 10/2009 | Jane Santamaria |
| 7,611,199 B2 | 11/2009 | Michalak et al. |
| 7,677,668 B2 * | 3/2010 | Olsen ............... B60N 2/206 |
| | | 297/378.14 |
| 7,712,833 B2 | 5/2010 | Ueda |
| 7,753,451 B2 | 7/2010 | Maebert et al. |
| 7,819,470 B2 | 10/2010 | Humer et al. |
| 7,845,729 B2 | 12/2010 | Yamada et al. |
| 7,850,247 B2 | 12/2010 | Stauske et al. |
| 7,857,381 B2 | 12/2010 | Humer et al. |
| 7,926,872 B2 | 4/2011 | Chida et al. |
| 7,967,379 B2 | 6/2011 | Walters et al. |
| 7,976,103 B2 | 7/2011 | Gamache et al. |
| 8,011,728 B2 | 9/2011 | Kohl et al. |
| 8,210,611 B2 | 7/2012 | Aldrich et al. |
| 8,226,165 B2 | 7/2012 | Mizoi |
| 8,240,758 B2 | 8/2012 | Combest |
| 8,297,708 B2 | 10/2012 | Mizobata et al. |
| 8,342,607 B2 | 1/2013 | Hofmann et al. |
| 8,371,655 B2 | 2/2013 | Nonomiya |
| 8,403,410 B1 | 3/2013 | Pinger et al. |
| 8,590,978 B2 | 11/2013 | Jaranson et al. |
| 8,678,500 B2 | 3/2014 | Lem et al. |
| 8,827,371 B2 | 9/2014 | Bmcick et al. |
| 8,899,683 B2 | 12/2014 | Ito |
| 8,967,663 B2 | 3/2015 | Seki et al. |
| 8,979,204 B2 | 3/2015 | Awata et al. |
| 9,296,352 B2 * | 3/2016 | Fujiwara ............... B60R 21/207 |
| 9,849,856 B1 * | 12/2017 | Line ............... B60N 2/42745 |
| 2004/0084937 A1 | 5/2004 | Berta |
| 2004/0108760 A1 | 6/2004 | McMillen |
| 2004/0183351 A1 | 9/2004 | Johnson et al. |
| 2007/0029853 A1 | 2/2007 | Forgatsch et al. |
| 2007/0118259 A1 | 5/2007 | Chernoff et al. |
| 2007/0138844 A1 | 6/2007 | Kim |
| 2008/0067850 A1 | 3/2008 | Stenstrom et al. |
| 2008/0136240 A1 | 6/2008 | Matthews et al. |
| 2010/0026066 A1 | 2/2010 | Graber et al. |
| 2010/0102599 A1 | 4/2010 | Itou et al. |
| 2010/0117414 A1 | 5/2010 | Hwang et al. |
| 2010/0140986 A1 | 6/2010 | Sawada |
| 2010/0148546 A1 | 6/2010 | Demontis et al. |
| 2010/0171346 A1 | 7/2010 | Laframboise et al. |
| 2010/0187881 A1 | 7/2010 | Fujita et al. |
| 2010/0207438 A1 | 8/2010 | Inoue et al. |
| 2010/0207443 A1 | 8/2010 | Bmcick |

(56) References Cited

U.S. PATENT DOCUMENTS

| | | | |
|---|---|---|---|
| 2010/0259089 A1* | 10/2010 | Mizobata | B60N 2/7011 297/452.56 |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0121624 A1 | 5/2011 | Bmcick et al. | |
| 2011/0260509 A1 | 10/2011 | Siu | |
| 2011/0278886 A1 | 11/2011 | Nitsuma | |
| 2011/0298261 A1 | 12/2011 | Holt et al. | |
| 2012/0013161 A1 | 1/2012 | Adams et al. | |
| 2012/0032478 A1 | 2/2012 | Friderich et al. | |
| 2012/0032486 A1 | 2/2012 | Baker et al. | |
| 2012/0037754 A1 | 2/2012 | Kladde | |
| 2012/0091766 A1 | 4/2012 | Yamaki et al. | |
| 2012/0119551 A1 | 5/2012 | Bmcick et al. | |
| 2012/0248839 A1 | 10/2012 | Fujita et al. | |
| 2013/0076092 A1 | 3/2013 | Kulkarni et al. | |
| 2013/0119715 A1 | 5/2013 | Medoro et al. | |
| 2013/0119723 A1 | 5/2013 | Nitsuma | |
| 2013/0119724 A1 | 5/2013 | Adachi et al. | |
| 2013/0119741 A1 | 5/2013 | Medoro et al. | |
| 2013/0134749 A1 | 5/2013 | Awata et al. | |
| 2013/0241255 A1 | 9/2013 | Kulkarni et al. | |
| 2013/0285426 A1 | 10/2013 | Arant et al. | |
| 2013/0300179 A1* | 11/2013 | Ota | B60N 2/5664 297/452.42 |
| 2013/0320742 A1 | 12/2013 | Murolo et al. | |
| 2014/0032043 A1 | 1/2014 | Line et al. | |
| 2014/0084661 A1* | 3/2014 | Awata | B60N 2/5825 297/452.18 |
| 2014/0203610 A1 | 7/2014 | Line et al. | |
| 2014/0284987 A1* | 9/2014 | Yasuda | B60N 2/68 297/452.18 |
| 2015/0217666 A1* | 8/2015 | Garbarino | B60N 3/046 428/100 |
| 2015/0274051 A1* | 10/2015 | Mueller | B60N 2/68 296/68.1 |
| 2016/0009210 A1* | 1/2016 | Sasaki | B60N 2/5657 297/180.13 |
| 2016/0096450 A1* | 4/2016 | Kondrad | B60N 2/7094 297/285 |
| 2016/0221481 A1* | 8/2016 | Sugiyama | B60N 2/686 |
| 2016/0236600 A1* | 8/2016 | Citron | B60N 2/5825 |
| 2017/0355290 A1* | 12/2017 | Line | B60N 2/643 |
| 2017/0355291 A1* | 12/2017 | Line | B60N 2/68 |
| 2017/0355292 A1* | 12/2017 | Line | B60N 2/72 |
| 2017/0361735 A1* | 12/2017 | Kondrad | B60N 2/72 |

FOREIGN PATENT DOCUMENTS

| | | |
|---|---|---|
| DE | 3735428 A1 | 5/1989 |
| DE | 4403071 A1 | 8/1994 |
| DE | 102004037069 A1 | 4/2005 |
| EP | 0386890 A1 | 9/1990 |
| EP | 0754590 A2 | 1/1997 |
| EP | 1839932 A2 | 10/2007 |
| EP | 1950085 A3 | 7/2008 |
| EP | 1329356 B1 | 11/2009 |
| EP | 2534979 A1 | 12/2012 |
| EP | 2574498 A1 | 4/2013 |
| EP | 2743124 A1 | 6/2014 |
| JP | 2011078557 A | 4/2011 |
| WO | 9511818 A1 | 5/1995 |
| WO | 9831992 A1 | 7/1998 |
| WO | 9919708 A1 | 4/1999 |
| WO | 9958022 A1 | 11/1999 |
| WO | 2007009893 A2 | 1/2007 |
| WO | 2008019981 A1 | 2/2008 |
| WO | 2008073285 A1 | 6/2008 |
| WO | 2010096307 A1 | 8/2010 |
| WO | 2011021952 A1 | 2/2011 |
| WO | 2011068684 A1 | 6/2011 |
| WO | 2013040085 A2 | 3/2013 |
| WO | 2014047417 A1 | 3/2014 |

OTHER PUBLICATIONS

MacMurray, Frankfurt 2009 Trend—Light and Layered, Sep. 24, 2009, GreenCarDesign, http://www.greencardesign.com/site/trends/00138-frankfurt-2009-trend-light-and-layered.

Rostra Precision Controls, Inc., Universal Lumbar Installation Instructions, Form #3132, Rev. F, Nov. 2, 2007, 8 pages.

M. Grujicic et al., "Seat-cushion and soft-tissue material modeling and a finite element investigation of the seating comfort for passenger-vehicle occupants," Materials and Design 30 (2009) 4273-4285.

"Performance' Car Seat Eliminates Steel," Published in Plastics News—Indian Edition Plastics & Polymer News,(http://www.plasticsinfomart.com/performance-car-seat-eliminates-steel/), Jan. 2012, 3 pages.

Imola Pro-fit, Cobra, (https://www.subesports.com/cobra/imola-pro-fit/cob-6000), 2001-2017, 4 pages.

Freedman Seating Company, "Go Seat," http://www.freedmanseating.com/images/uploads/files/GOSeat_Brochure_10-19.pdf, accessed Apr. 27, 2017, 2 pgs.

Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.

Recaro GmbH & Co. KG, "Seat Range", ID No. 7218054, Mar. 2010, 21 pgs.

LEXUS, "The all-new LEXUS 2013", lexus.com P2-332, Feb. 2012, 13 pgs.

General Motors LLC, "2013 Chevrolet Spark Owner Manual," copyright 2012, 356 pages.

* cited by examiner

SEATBACK COMFORT CARRIER

FIELD OF THE DISCLOSURE

The present disclosure generally relates to a vehicle seating assembly, and more particularly to a seatback comfort carrier for a vehicle seating assembly.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seating assembly includes a seatback. A back panel includes a front closeout panel. A carrier supports the seatback and includes an upper thoracic region having a peripheral support. A peripheral gap is defined between the front closeout panel and the upper thoracic region. A bottom portion of the upper thoracic region includes a lower wall having a sinusoidal configuration. A lower lumbar region includes a peripheral support. A peripheral gap is defined between the front closeout panel and the lower lumbar region. An upper portion of the lower lumbar region includes an upper wall having a sinusoidal configuration. A plurality of concave connectors couple the lower wall of the upper thoracic region with the upper wall of the lower lumbar region.

According to another aspect of the present disclosure, a vehicle seating assembly includes a back panel having a front closeout panel. A carrier supports a seatback and includes a thoracic region defining a peripheral gap between the front closeout panel and the thoracic region. A lower wall of the thoracic region includes a sinusoidal configuration. A lumbar region defines a peripheral gap between the front closeout panel and the lumbar region. An upper wall of the lumbar region includes a sinusoidal configuration.

According to yet another aspect of the present disclosure, a vehicle seating assembly includes a back panel having a front closeout panel. A carrier supports a seatback and includes a thoracic region having a lower wall having a sinusoidal configuration. A lumbar region includes an upper wall having a sinusoidal configuration and a lower wall with retention slots configured to receive a cushion attachment tether removably secured with an engagement post.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
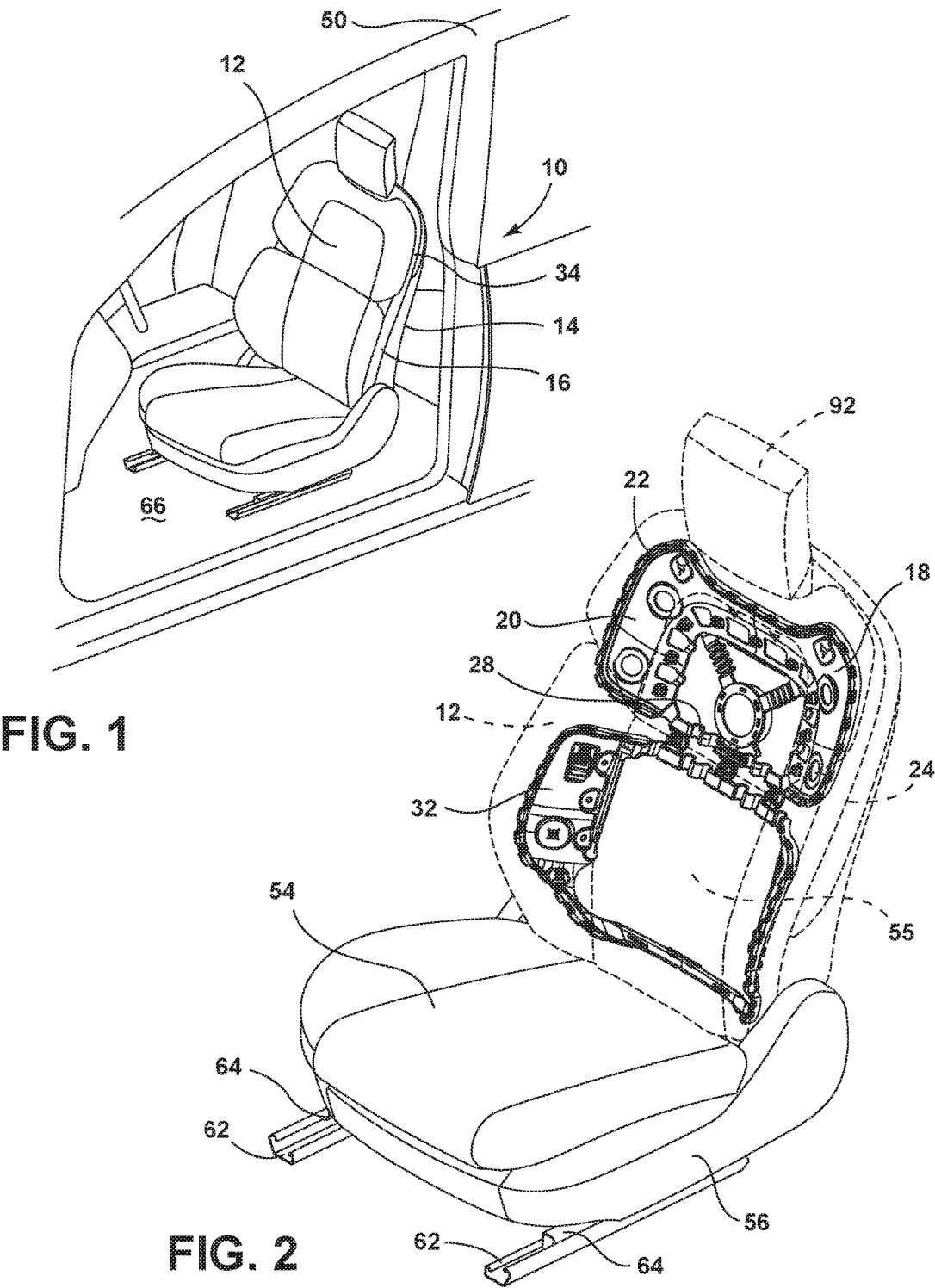
FIG. 1 is a top perspective view of one embodiment of a vehicle seating assembly of the present disclosure.
FIG. 2 is a top perspective view of the vehicle seating assembly of FIG. 1, but with a majority of the vehicle seating assembly in phantom and a seatback carrier shown in solid.
Figures 3, 4:
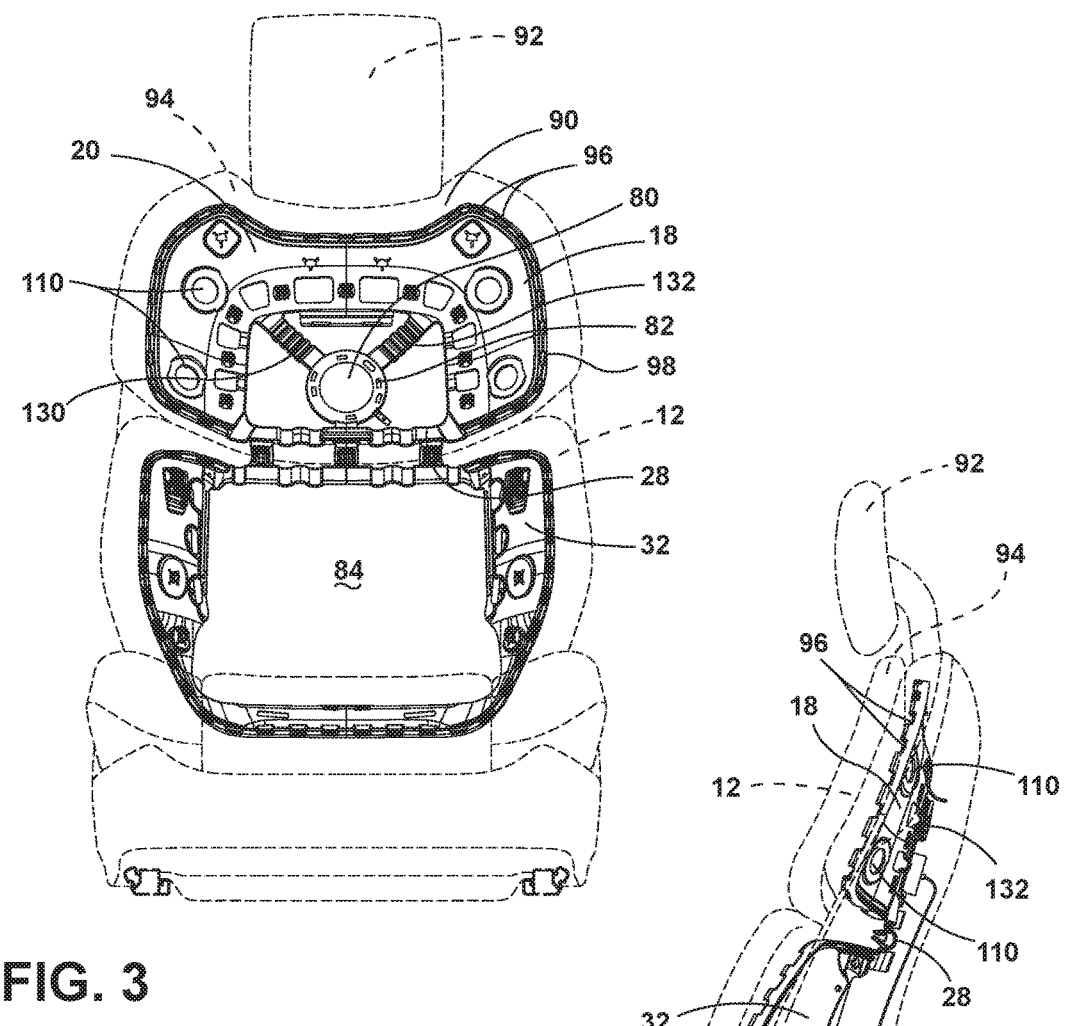
FIG. 3 is a front elevational view of the seatback carrier of FIG. 2.
FIG. 4 is a side elevational view of the seatback carrier of FIG. 2.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-22, reference numeral 10 generally designates a vehicle seating assembly including a seatback 12 having a back panel 14 with a front closeout panel 16. A carrier 18 is supported inside the seatback 12 and includes an upper thoracic region 20 having a peripheral support 22. A peripheral gap 24 is defined between the front closeout panel 16 and the upper thoracic region 20. A bottom portion 26 of the upper thoracic region 20 includes a lower wall 28 having a sinusoidal configuration. The vehicle seating assembly 10 also includes a lower lumbar region 32 having a peripheral support 34. A peripheral gap 36 is defined between the front closeout panel 16 and the lower lumbar region 32. An upper portion 38 of the lower lumbar region 32 includes an upper wall 40 having a sinusoidal configuration. A plurality of concave connectors 42 couple the lower wall 28 of the upper thoracic region 20 with the upper wall 40 of the lower lumbar region 32.

With reference to FIGS. 1 and 2, the vehicle seating assembly 10 is generally configured for use inside a vehicle 50 and includes a seat 52 defining a seating surface 51 in addition to the seatback 12 defining a seatback surface 53. Both the seat 52 and the seatback 12 include a cushion assembly 54, 55, respectively, disposed thereon. It is generally contemplated that the vehicle 50 may include an automobile, such as a car, a truck, or a van, and that the vehicle seating assembly 10 will be adjustable within the vehicle 50. The cushion assembly 54 is coupled with a seat frame 56, while the cushion assembly 55 is supported on a seatback frame 57. The vehicle seating assembly 10 is positioned on a slide assembly 60, including a rail 62 and a slide 64. The rail 62 is generally fastened to a floor 66 of the vehicle 50 and the slide 64 is fastened to the vehicle seating assembly 10. The rail 62 and the slide 64 are slidably adjustable relative to one another, such that the vehicle seating assembly 10 is adjustable fore and aft within the vehicle 50. The vehicle seating assembly 10 also includes a variety of other adjustability functions, including adjustability of the seatback 12, which may include upper thoracic and lumbar support, as well as reclining functions. The seat 52 is also adjustable and includes thigh and leg adjustability.

With reference to FIGS. 2-6, in the illustrated embodiment, the carrier 18 for the seatback 12 is configured to support the weight of a passenger applying pressure to the cushion assembly 55 disposed on the seatback 12. Accordingly, the carrier 18 generally creates an interface between the cushion assembly 55 and the structural components of the seatback 12. The carrier 18 includes a variety of connection points 72 for coupling with the cushion assembly 55, a coverstock 74, and directly to the seatback frame 57. The carrier 18 is generally defined by the upper thoracic region 20 and the lower lumbar region 32. The concave connectors 42 couple the lower wall 28 of the upper thoracic region 20 with the upper wall 40 of the lower lumbar region 32. The upper thoracic region 20 generally defines an interior cavity 80 within which a fan support 82 is positioned. Similarly, the lower lumbar region 32 also defines a central space 84 that may include climate comfort features, lumbar support features, etc.

With reference to FIGS. 2-4 and 6-9, the carrier 18 includes an upper scalloped portion 90 configured to accommodate a head restraint 92 disposed on a top portion 94 of the seatback 12. In addition, the carrier 18 includes a plurality of coverstock detents 96 disposed about a peripheral edge 98 of the carrier 18. The coverstock detents 96 are configured to receive fasteners disposed about a periphery 100 of the coverstock 74. The fasteners are designed to engage directly with the peripheral edge 98 of the carrier 18, thereby supporting the coverstock 74 and the cushion assembly 55 on the carrier 18. In addition, the upper thoracic region 20 of the carrier 18 includes snap-fit connection apertures 110 designed to receive snap-fit connectors disposed on a forward side of an articulating upper thoracic support of the seatback 12. A plurality of coverstock securing members 120 are located adjacent to an intermediate space 122 defined in the upper thoracic region 20. The coverstock securing members 120 are spaced a predetermined distance and designed to engage intermediate fasteners on a backside of the coverstock 74. In addition, a variety of spacing apertures 124 are disposed between each of the coverstock securing member 120.

With reference again to FIGS. 2-4 and 6-9, the fan support 82 are operably coupled with the lower wall 28 of the upper thoracic region 20 and also coupled with first and second angled supports 130, 132. Each of the first and second angled supports 130, 132 extends into the intermediate space 122 of the upper thoracic region 20 and each includes an undulating or sinusoidal configuration. This construction allows for flexibility and movement of the fan support 82 to accommodate the different weights of users and also different postures and loads that can affect the seatback 12. As previously noted, the bottom portion of the upper thoracic region 20 includes the lower wall 28, which has an undulating or sinusoidal configuration. Notably, the undulating or sinusoidal configuration of the lower wall 28 of the upper thoracic region 20 undulates in a plane generally parallel with a seating surface of the seat 52. Accordingly, the undulations extend forward and rearward relative to the seatback surface. The upper portion of the lower lumbar region 32, and more specifically, the upper wall 40 of the lower lumbar region 32 includes a sinusoidal configuration as well. The sinusoidal configuration of the upper wall 40 of the lower lumbar region 32 also undulates forward and rearward relative to the seatback 12. It will be understood that the carrier 18 is generally curved to complement the shape of the back of an occupant. More specifically, the upper thoracic region 20 is shaped to generally cradle and support the upper back of an occupant, while the lower lumbar region 32 is designed to cradle and support the lower back of an occupant.

Figure 5:
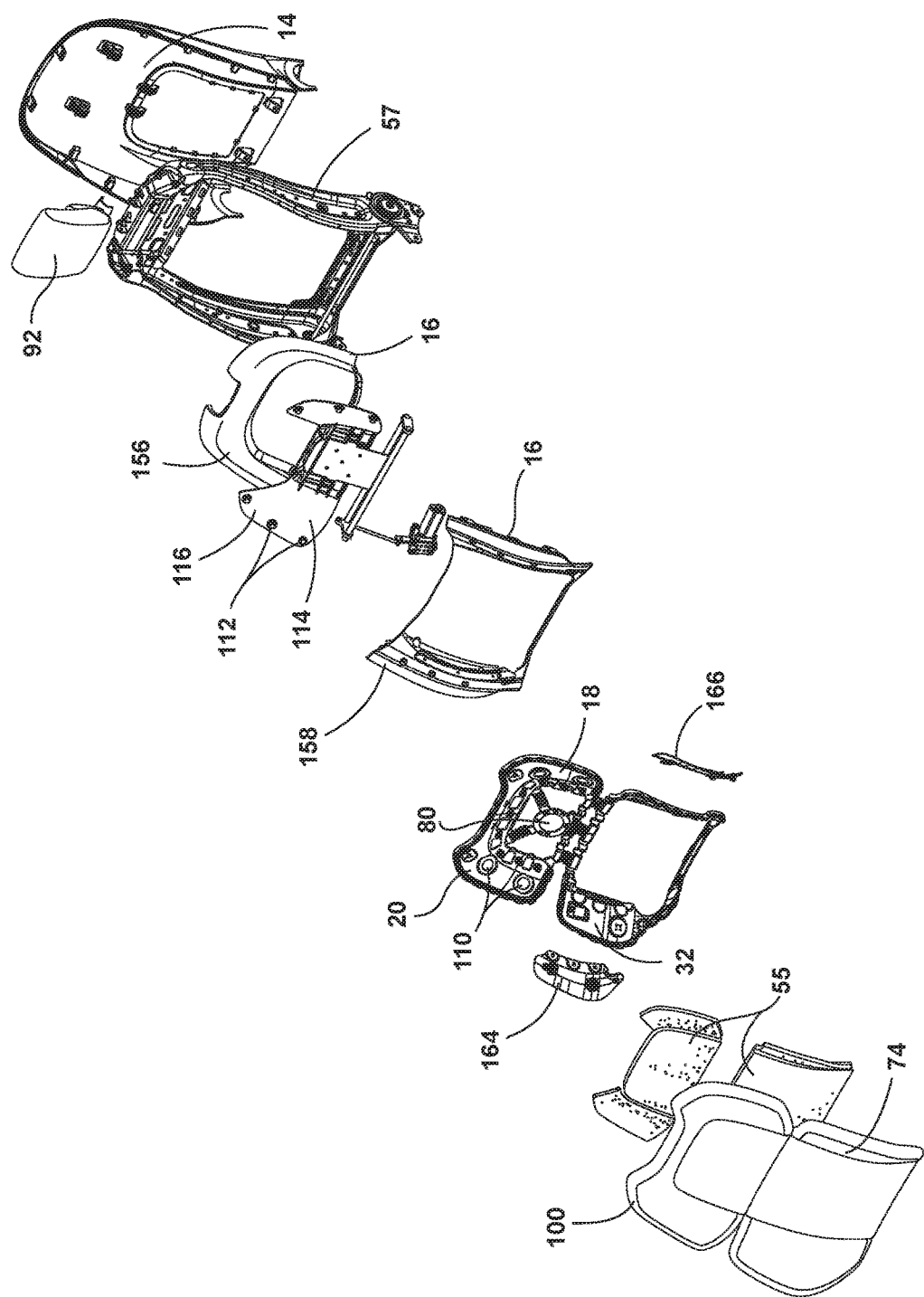
FIG. 5 is a top perspective exploded view of the vehicle seatback assembly of the present disclosure.
Figure 6:
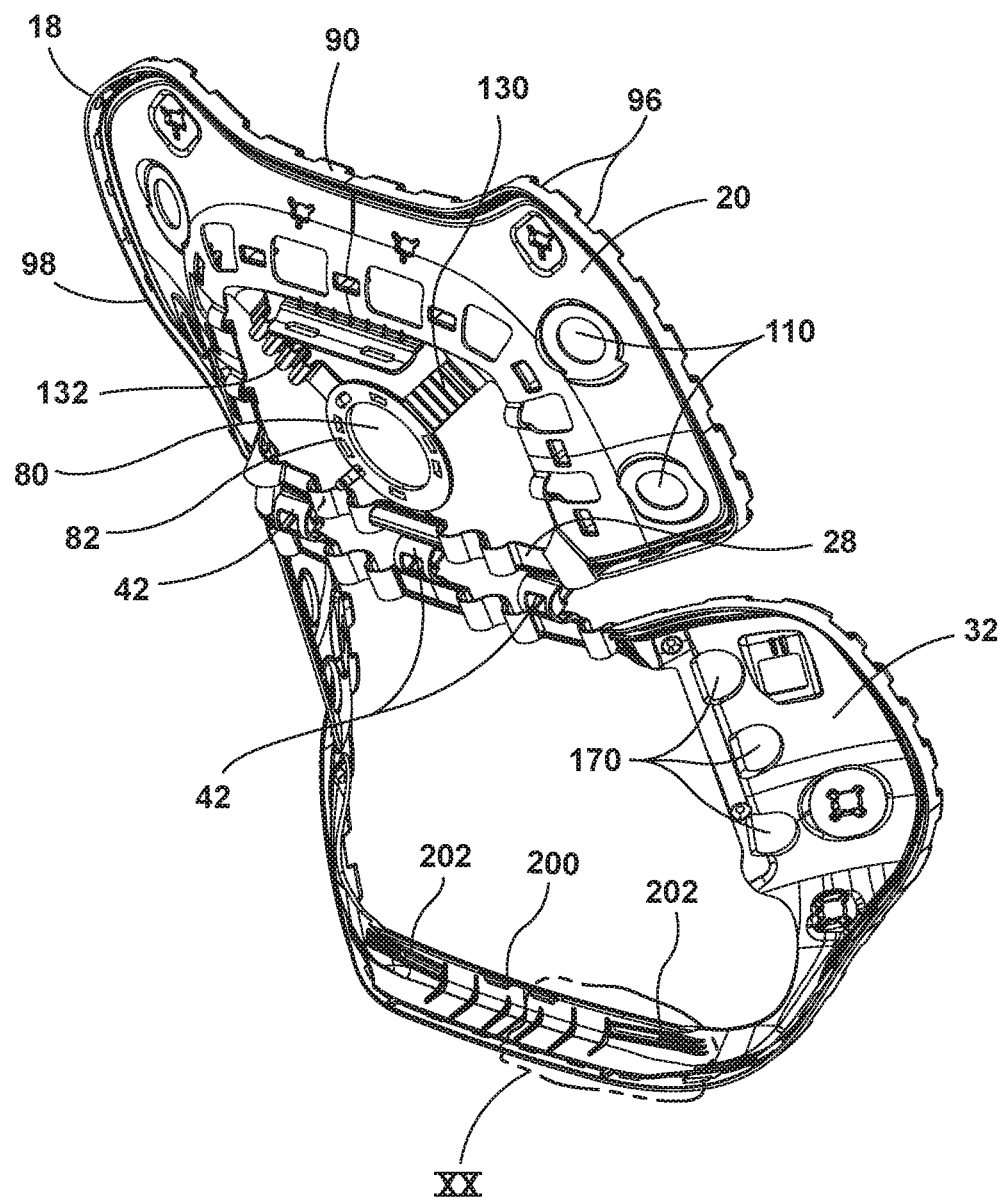
FIG. 6 is a top rear perspective view of the seatback carrier of FIG. 5.
Figure 7:
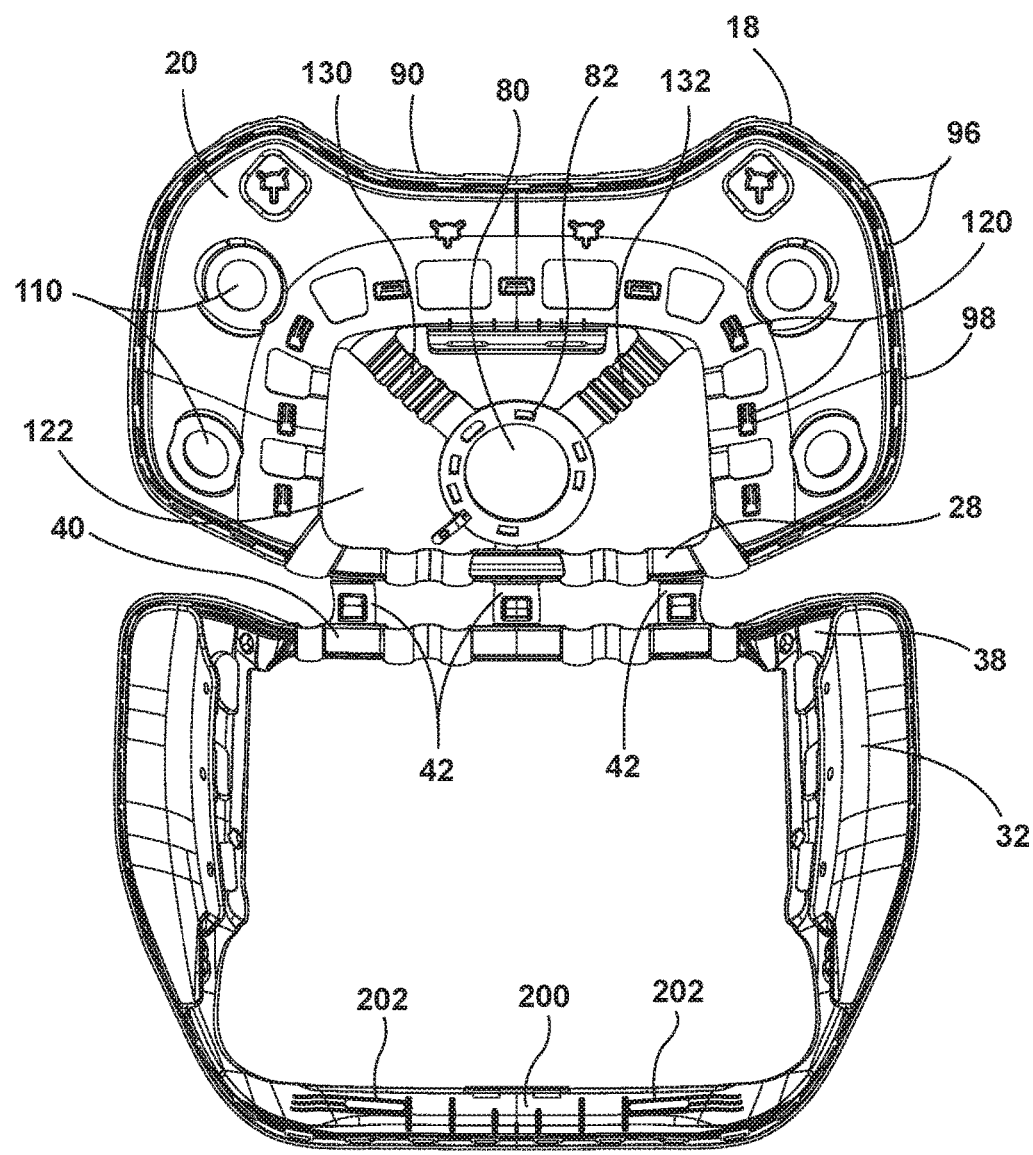
FIG. 7 is a rear elevational view of the seatback carrier of FIG. 6.
Figure 8:
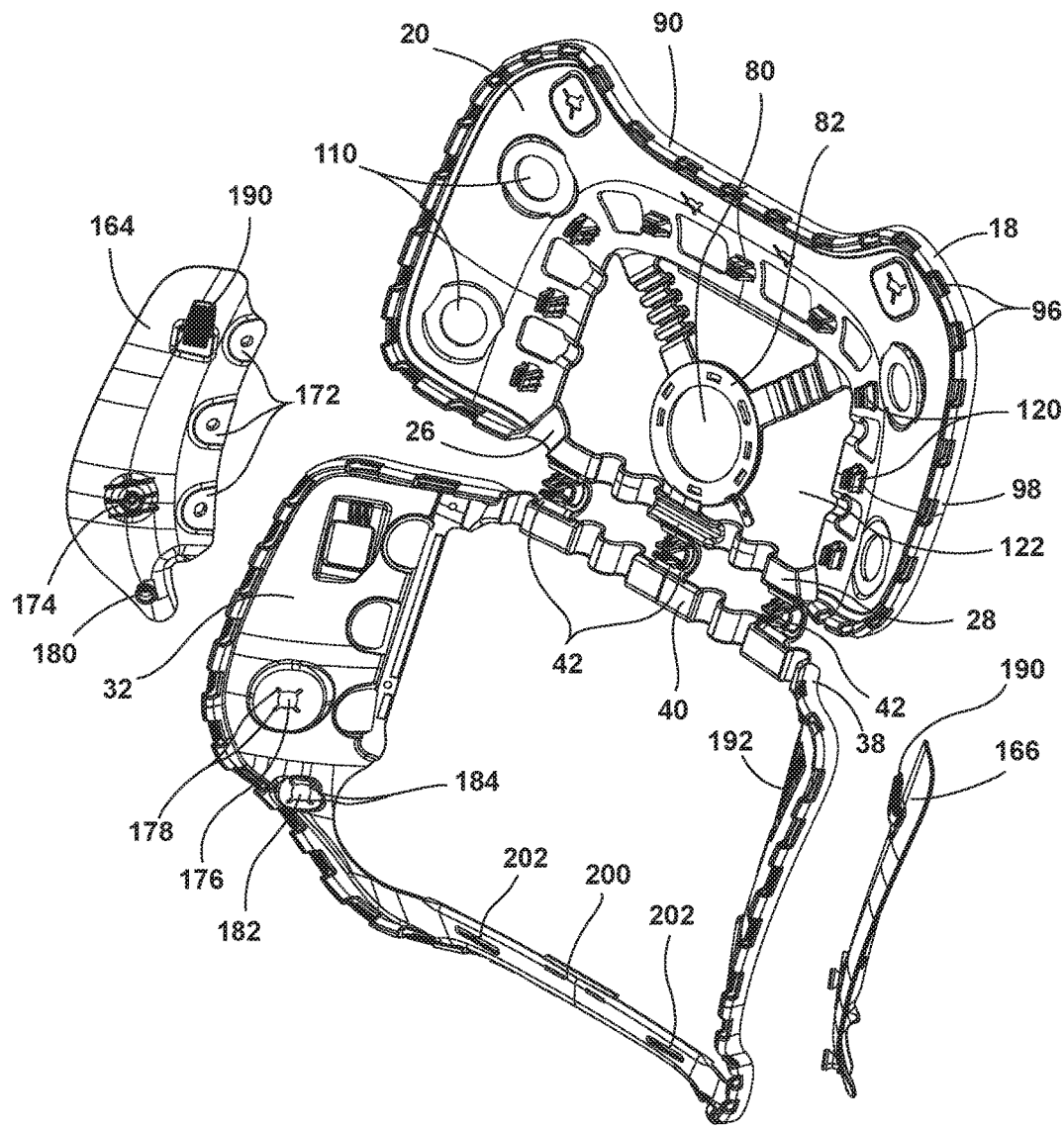
FIG. 8 is a top perspective view of the seatback carrier of FIG. 5, before installation of side cushion supports.
Figure 9:
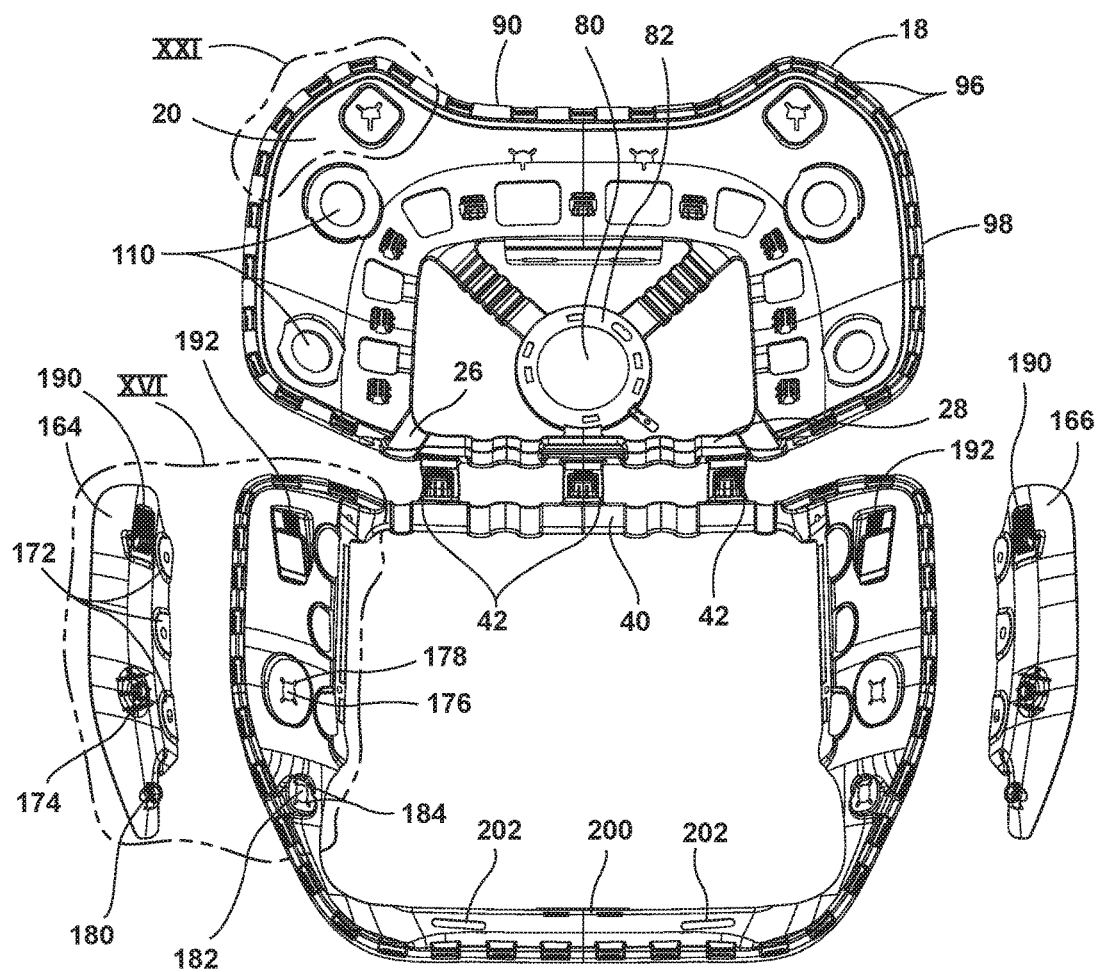
FIG. 9 is a front elevational view of the seatback carrier and cushion supports of FIG. 8.
Figure 10:
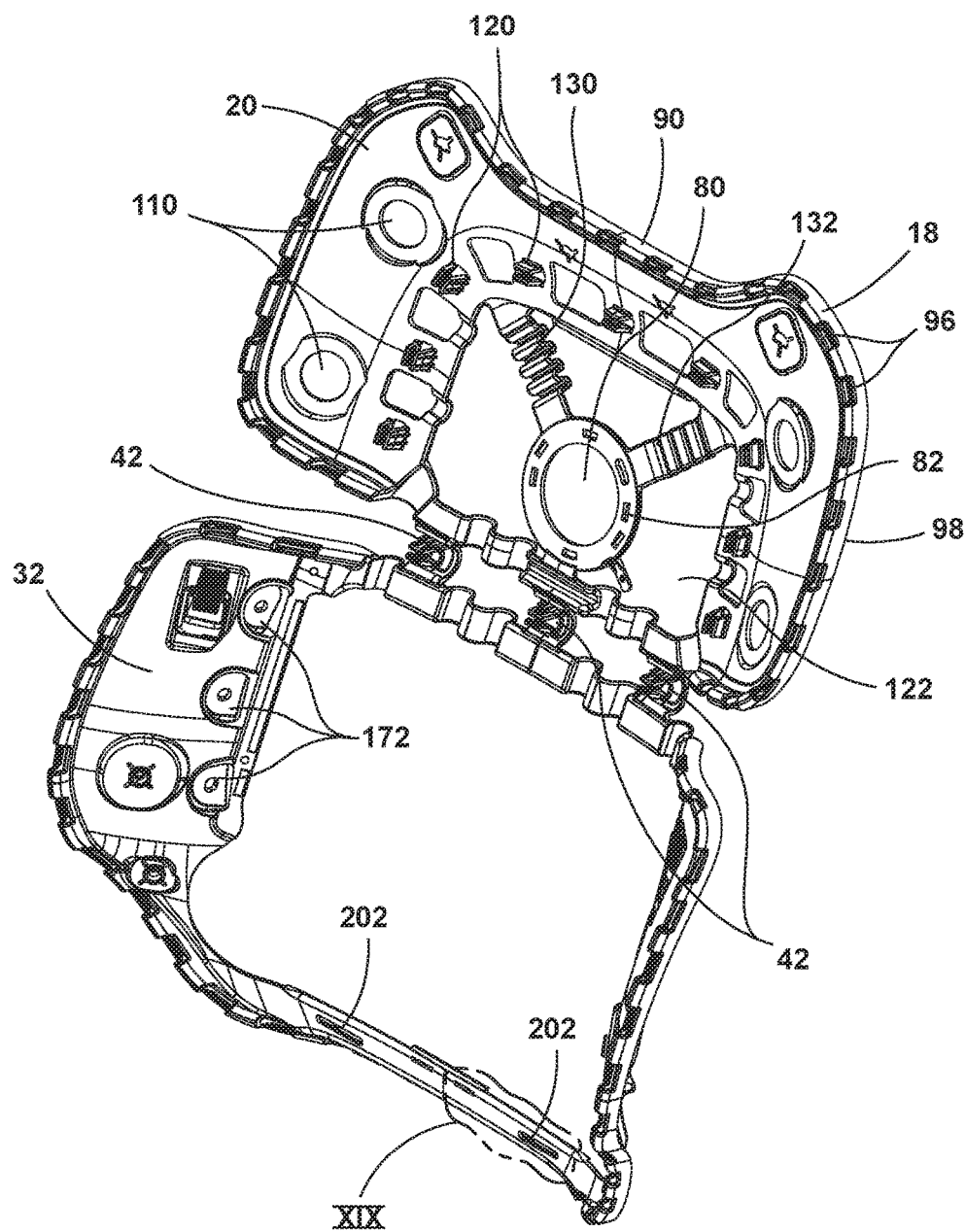
FIG. 10 is an enlarged top perspective view of a seatback carrier of the present disclosure.
Figure 11:
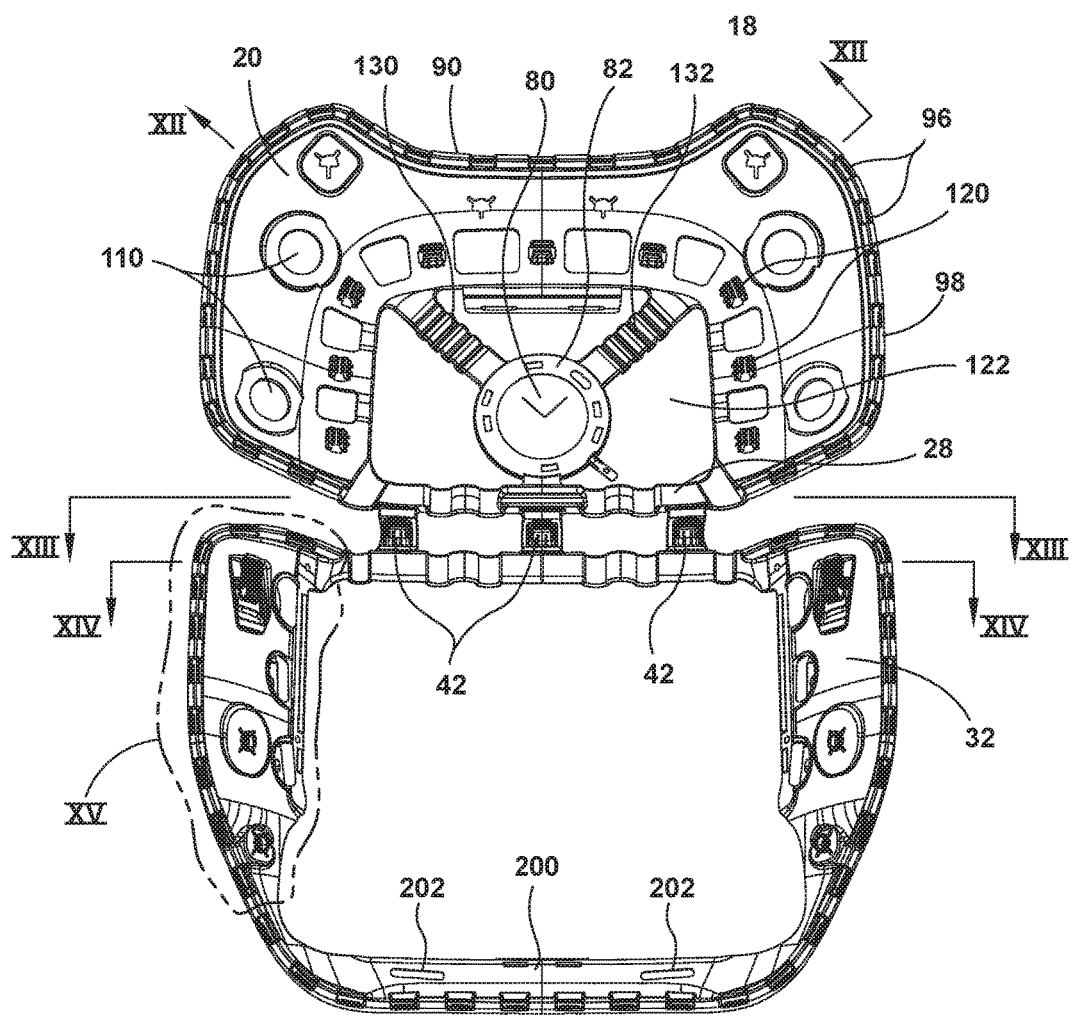
FIG. 11 is a front elevational view of the seatback carrier of FIG. 10.

With reference now to FIG. 5, in the illustrated embodiment, the seatback 12 of the vehicle seating assembly 10 includes the following components. The seat frame 56 is connected with the seat 52 and provides general structural support to the occupant. The back panel 14 is connected with a rear portion of the seatback frame 57. The head restraint 92 is disposed above the seatback frame 57 and is operably coupled therewith. The head restraint 92 may include a variety of functions, including forward and rearward motion, as well as upward and downward motion, to better support the head of an occupant. In addition, the vehicle seating assembly 10 includes an upper thoracic support 116 that is adjustable between forward and rearward positions. The upper thoracic support 116 is located in front of the front closeout panel 16. The front closeout panel 16 includes an upper portion 156 and a lower portion 158. The upper portion 156 of the front closeout panel 16 wraps around a front portion of the seatback frame 57 and couples with the hard back panel 14. The lower portion 158 of the front closeout panel 16 engages with a lower portion of the seatback frame 57 and engages a lower portion of the hard back panel 14. The peripheral gap 24 is defined between the upper portion 156 of the thoracic support 116 and the front closeout panel 16. The peripheral gap 24 is also located between the lower lumbar region 32 and the lower portion 158 of the front closeout panel 16. First and second side support members 164, 166 are configured to be fastened with sides of the carrier 18. The entire carrier 18, as well as first and second side support members 164, 166, are designed to engage the upper portion 156 and the lower power 158 of the front closeout panel 16. At the same time, the carrier 18 supports the cushion assembly 55 and the coverstock 74. The cushion assembly 55 may be operably coupled with the coverstock 74 via a glue or adhesive, or via fasteners configured to engage the front of the cushion assembly 55, as previously disclosed.

With reference now to FIGS. 6-10, 15 and 16, the carrier 18 includes openings 170 on each side of the lower lumbar region 32. The openings 170 are designed to receive engagement features 172 on each of the first and second side support members 164, 166. In addition, a lower protuberance 174, which extends in a forward direction, is configured to engage an aperture 176 having peripheral slots 178. The aperture 176 is configured to receive the protuberance 174 and secure the same such that the first and second side support members 164, 166 can be retained on the carrier 18. In addition, a second lower protuberance is disposed below the protuberance 174, and is configured to engage a lower aperture 182 on the carrier 18. A lower opening 182 also includes peripheral slots 184. Each of the protuberances 174, 180 maintain the first and second side support members 164, 166 in secure abutment with the carrier 18. In addition, an upwardly turned hook 190 is disposed on an upper portion of each of the first and second side support members 164, 166. The upper hook securely engages an engagement wall 192 on a forward side of the carrier 18. It will be understood that the first and second side support members 164, 166 are mirror images of one another.

Figure 12:
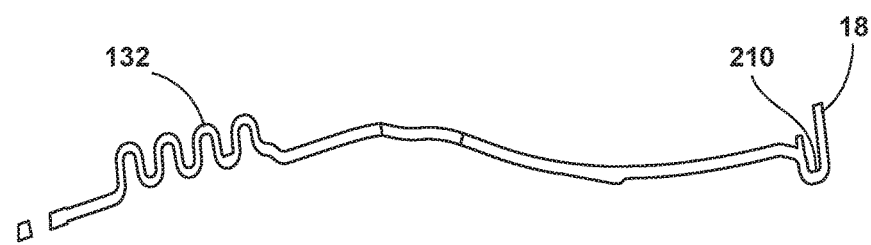
FIG. 12 is a top cross-sectional view taken at line XII-XII of FIG. 11.
Figure 13:
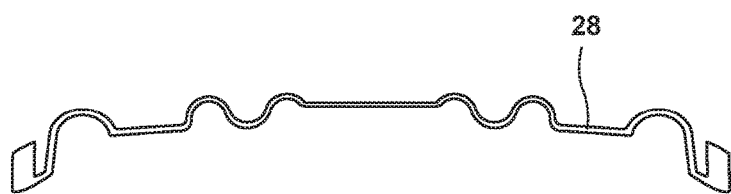
FIG. 13 is a top elevational cross-sectional view taken through line XIII-XIII of FIG. 11.
Figure 14:
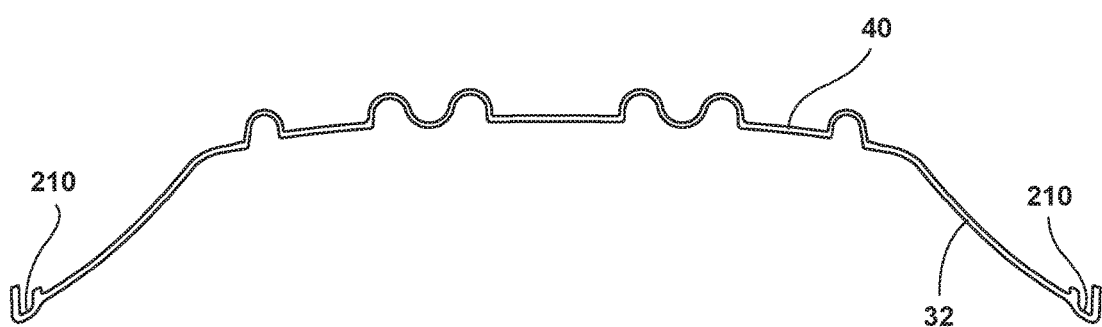
FIG. 14 is a top elevational cross-sectional view of line XIV-XIV of FIG. 11.
Figure 15:
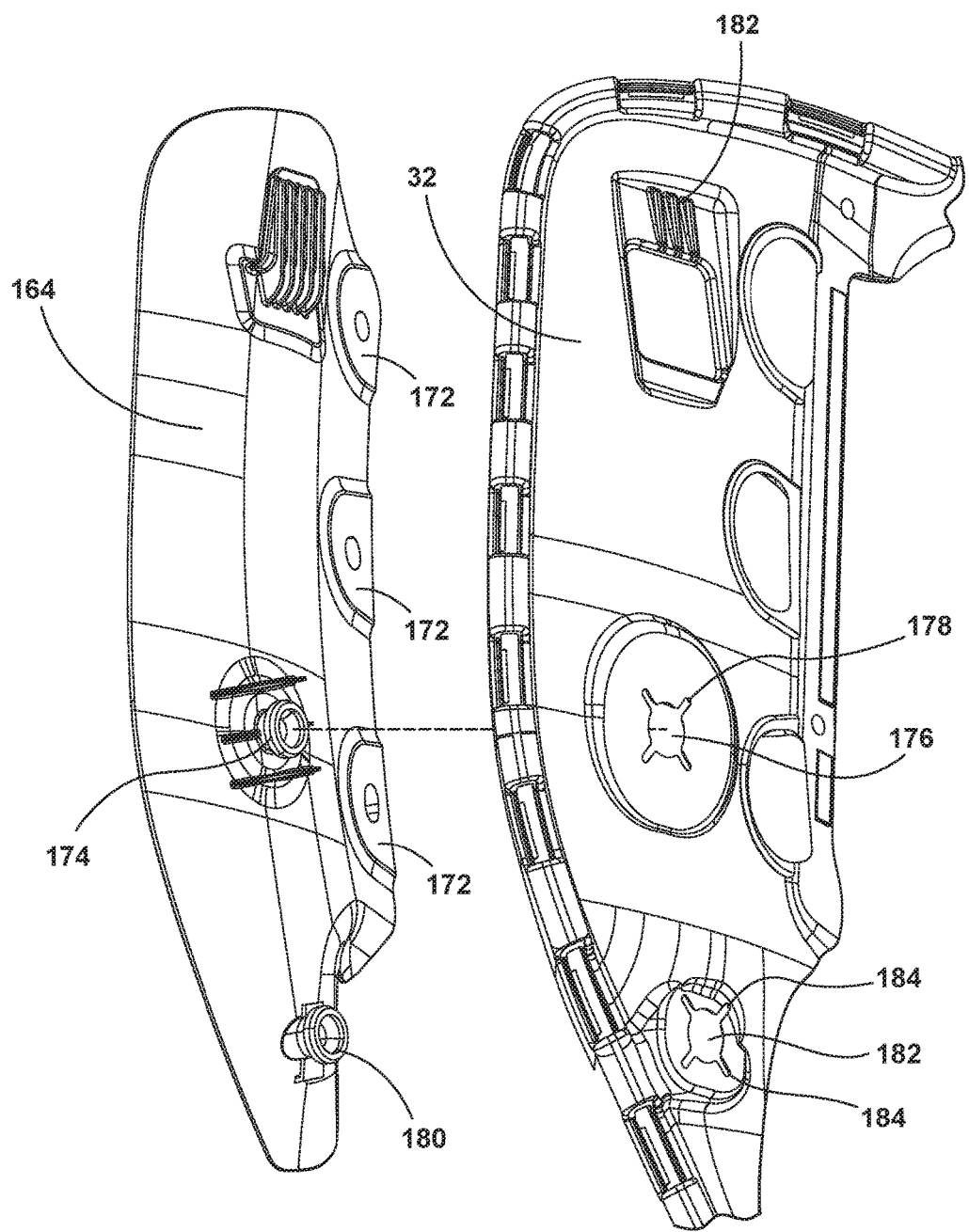
FIG. 15 is a front elevational view of area XV of FIG. 11.
Figure 16:
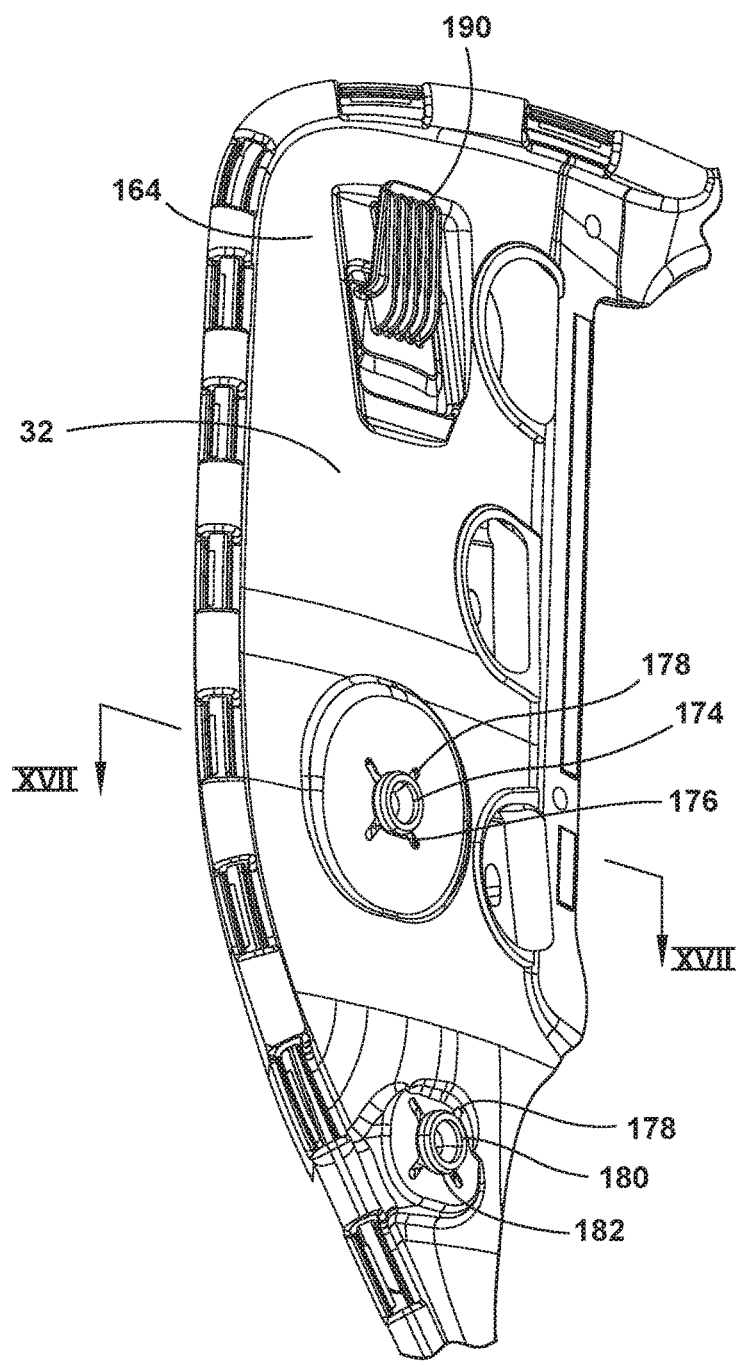
FIG. 16 is a front elevational view of area XVI of FIG. 9.

With reference now to FIGS. 12-14, various undulating or sinusoidal configurations of portions of the carrier 18 are illustrated. FIG. 12 illustrates an undulating or configuration that extends along the first and second angled supports 130, 132. The undulating configuration that extends along the first and second angled supports 130, 132 allows flexibility of the fan support 82 such that the fan support 82, or a fan disposed therein, does not provide for an uncomfortable projection into the back of a passenger. In addition, the first and second angled supports 130, 132, and the sinusoidal configuration of the first and second angled supports 130, 132, allow for flexible movement of the fan support 82 relative to the already flexible carrier 18. FIG. 13 illustrates the sinusoidal configuration across the lower wall 28 of the upper thoracic region 20. The sinusoidal configuration allows for flexible movement of the upper thoracic region 20 relative to the lower lumbar region 32. The lower wall 28 of the upper thoracic region 20 is operably coupled with the upper wall 40 of the lower lumbar region 32 via the concave connectors 42. Accordingly, flexibility in both lateral and vertical directions is provided. For even additional flexibility, the sinusoidal configuration is provided in the upper wall 40 of the lower lumbar region 32, as shown in FIG. 14. It will also be noted that a periphery of the upper thoracic region 20 and lower lumbar region 32 includes a rearwardly opening slot configured to receive trim stock fasteners that secure a trim stock to a rear portion of the carrier 18.

Figure 17:
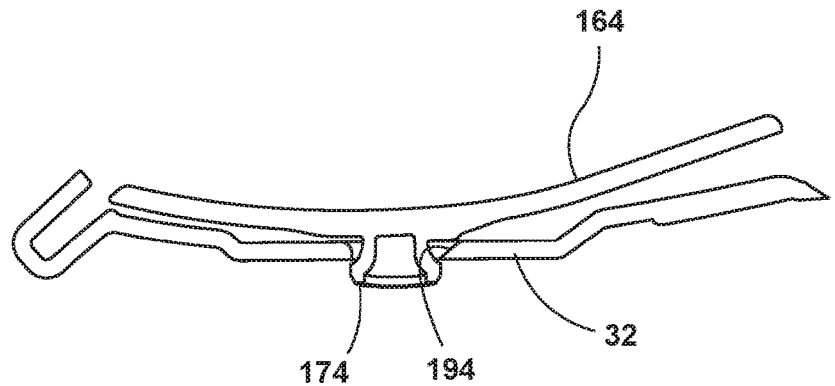
FIG. 17 is a top elevational cross-sectional view of the connecting members after engagement.
Figure 18:
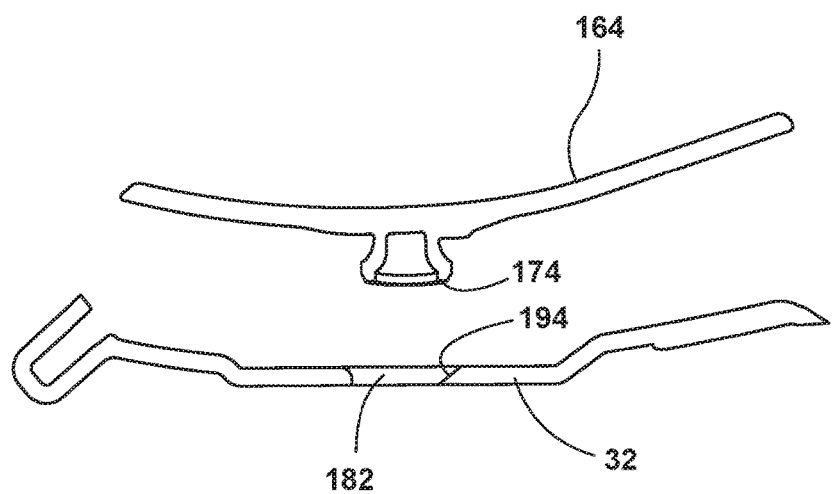
FIG. 18 is a top elevational cross-sectional view of the connecting members of FIG. 17, after disengagement.

With reference to FIGS. 17 and 18, the illustrated embodiment shows the configuration of the protuberances 174, 180 relative to the apertures 176, 182, respectively. As illustrated, an inner wall 194 that defines the apertures 176, 180 is canted or angled on a side of the apertures 176, 182 to provide an easier snap fit connection with the protuberances 174, 180. This construction has the added benefit of maintaining a more secure connection between the protuberances 174, 180 and the apertures 176, 182. The cant or angled wall portion is specifically sized and fitted to retain the protuberances 176, 180 during use.

Figure 19:
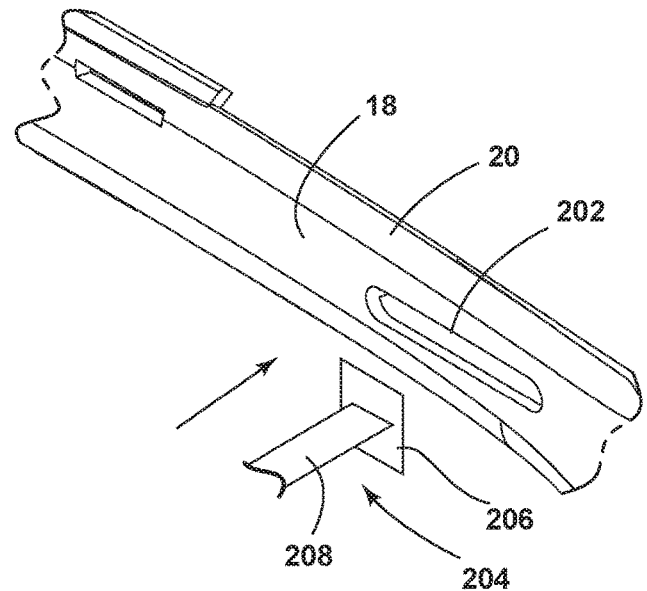
FIG. 19 is a top perspective view of area XIX of FIG. 10.
Figure 20:
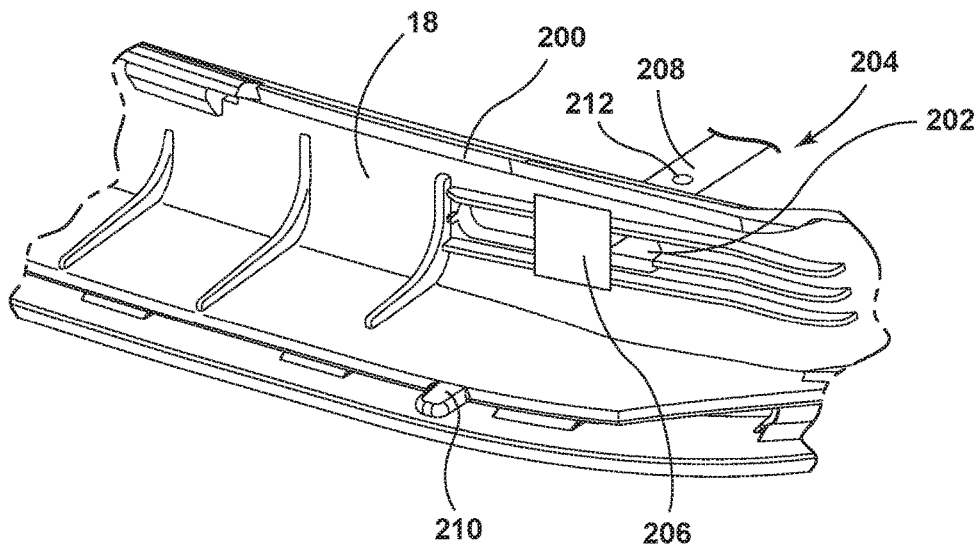
FIG. 20 is a rear perspective view of the seatback carrier of FIG. 6 taken of area X-X.

With reference now to FIGS. 8-12, as well as FIGS. 19 and 20, a lower cross-member 200 of the carrier 18 includes lateral elongate slots 202. The elongate slots 202 are configured to receive engagement features in the form of retention tethers 204 that include a securing member 206 and a flexible band 208 connected to the securing member 206. The flexible band 208 may be secured with the cushion assembly 55 or the coverstock 74 and may be elastic in nature, allowing for expansion and contraction. The retention tethers 204 provide a releasable yet reliable engagement of the cushion assembly 55 with the carrier 18 (FIGS. 19 and 20). A rearwardly extending tab 210 may extend from a base wall of the carrier 18. The rearwardly extending tab 210 may be engaged with an aperture 212 defined in the flexible band 208 of the retention tether 204.

Figure 21:
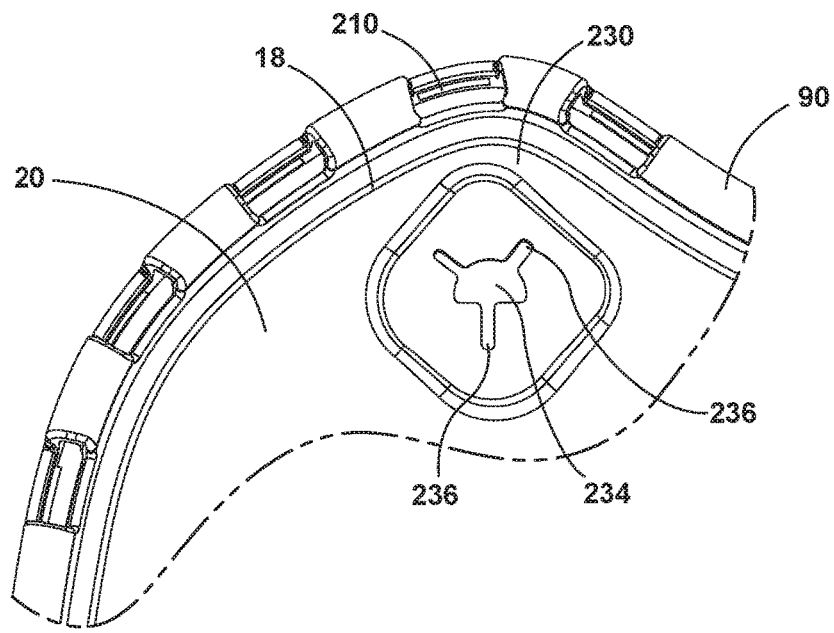
FIG. 21 is a partial front elevational view of the seatback carrier of FIG. 9 taken at area XXI-XXI.
Figure 22:
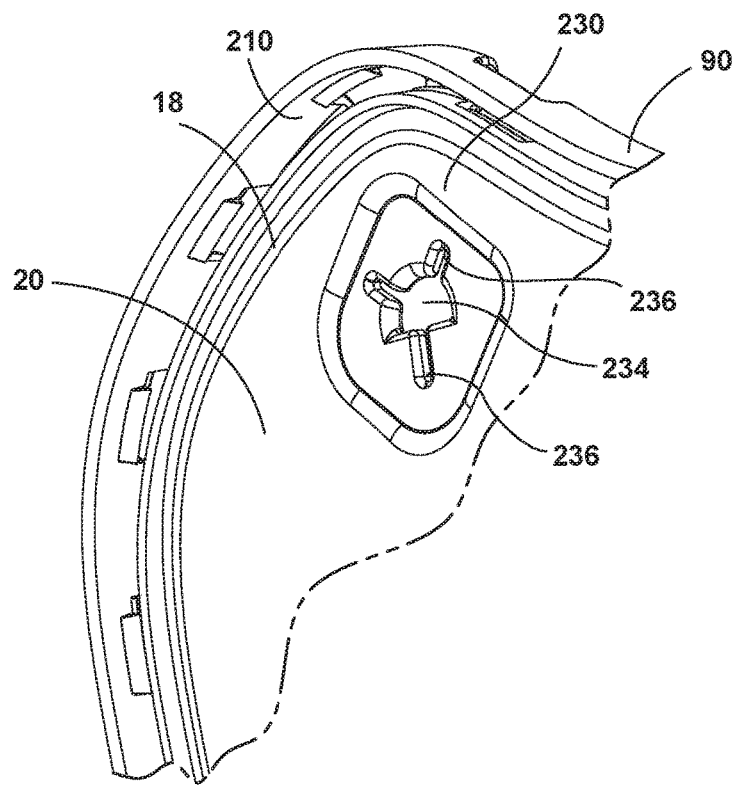
FIG. 22 is a rear perspective view of the carrier portion shown in FIG. 21.

With reference now to FIGS. 21 and 22, upper corners 230 of the carrier 18, and more specifically of the upper thoracic region 20 of the carrier 18, include a generally planar portion with a fastener receiving aperture 234. The fastener receiving aperture 234 includes slots configured to accommodate a mechanical fastener engaging the fastener receiving aperture 234. The fastener receiving aperture 234 includes a generally semicircular construction with slots 236 extending therefrom. In the illustrated embodiment, the slots 236 extend approximately 120 degrees from one another. However, it will be understood that the slots 236 may extend at any angle relative to one another, and may be more than or less than three slots 236 that extend from the fastener receiving aperture 234.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
a seatback;
a back panel coupled with a front closeout panel; and
a carrier supporting the seatback and including:
an upper thoracic region including a peripheral support, wherein a peripheral gap is defined between the front closeout panel and the upper thoracic region, wherein a bottom portion of the upper thoracic region includes a lower wall having an undulating configuration;
a lower lumbar region including a peripheral support, wherein a peripheral gap is defined between the front closeout panel and the lower lumbar region, wherein an upper portion of the lower lumbar region includes an upper wall having an undulating configuration; and
a plurality of concave connectors that couple the lower wall of the upper thoracic region with the upper wall of the lower lumbar region.

2. The vehicle seating assembly of claim 1, wherein the undulating configuration of the lower wall of the upper thoracic region is generally aligned with the undulating configuration of the upper wall of the lumbar region.

3. The vehicle seating assembly of claim 1, further comprising:
an air mover support disposed centrally in the upper thoracic region.

4. The vehicle seating assembly of claim 3, wherein the air mover support is directly coupled with the lower wall of the upper thoracic region.

5. The vehicle seating assembly of claim 1, further comprising:
a base wall defined by the lumbar region, the base wall including a slot that receives a retention tether of a seat cushion component.

6. The vehicle seating assembly of claim 5, further comprising:
a rearwardly extending tab that extends from the base wall and which is engaged with an aperture defined in the retention tether.

7. The vehicle seating assembly of claim 1, further comprising:
a plurality of slots defined by a U-shaped fold at a periphery of the upper thoracic region, the plurality of slots configured to retain a trim piece connector; and
a retention nub proximate each slot and disposed inside the U-shaped fold.

8. A vehicle seating assembly comprising:
a carrier adjacent a front closeout panel and supporting a seatback, the carrier including:
a thoracic region defining a peripheral gap between the front closeout panel and the thoracic region, a lower wall of the thoracic region including an undulating configuration; and
a lumbar region defining a peripheral gap between the front closeout panel and the lumbar region, an upper wall of the lumbar region including an undulating configuration.

9. The vehicle seating assembly of claim 8, wherein the undulating configuration of the lower wall of the upper thoracic region is generally aligned with the undulating configuration of the upper wall of the lumbar region.

10. The vehicle seating assembly of claim 8, further comprising:
an air mover support disposed centrally in the upper thoracic region.

11. The vehicle seating assembly of claim 10, wherein the air mover support is directly coupled with the lower wall of the upper thoracic region.

12. The vehicle seating assembly of claim 8, further comprising:
a base wall defined by the lumbar region, the base wall including a slot that receives a retention tether of a seat cushion component.

13. The vehicle seating assembly of claim 12, further comprising:
a rearwardly extending tab that extends from the base wall and which is engaged with an aperture defined in the retention tether.

14. The vehicle seating assembly of claim 8, further comprising:
a plurality of slots defined by a U-shaped fold at a periphery of the upper thoracic region, the plurality of slots configured to retain a trim piece connector; and
a retention nub proximate each slot and disposed inside the U-shaped fold.

15. A vehicle seating assembly comprising:
a back panel coupled with a front closeout panel;
a carrier supporting a seatback and including:
a thoracic region including a lower wall having an undulating configuration; and
a lumbar region including an upper wall having an undulating configuration and a lower wall with retention slots configured to receive a cushion attachment tether removably secured with an engagement post,
a plurality of slots defined by a U-shaped fold at a periphery of the upper thoracic region, the plurality of slots configured to retain a trim piece connector; and
a retention nub proximate each slot and disposed inside the U-shaped fold.

16. The vehicle seating assembly of claim 15, wherein the undulating configuration of the lower wall of the upper thoracic region is generally aligned with the undulating configuration of the upper wall of the lumbar region.

17. The vehicle seating assembly of claim 15, further comprising:
   an air mover support disposed centrally in the upper thoracic region.

18. The vehicle seating assembly of claim 17, wherein the air mover support is directly coupled with the lower wall of the upper thoracic region.

* * * * *